United States Patent [19]

Fairman

[11] Patent Number: 4,860,781
[45] Date of Patent: Aug. 29, 1989

[54] HYDRAULIC ISOLATION VALVE

[75] Inventor: Ronald E. Fairman, Adams, N.Y.

[73] Assignee: General Signal Corporation, Stamford, Conn.

[21] Appl. No.: 184,062

[22] Filed: Apr. 20, 1988

[51] Int. Cl.$^4$ .............................................. B60T 17/18
[52] U.S. Cl. ...................................... 137/118; 303/71; 303/84.2
[58] Field of Search ..................... 137/87, 118; 303/71, 303/84.1, 84.2, 9.63; 188/170

[56] References Cited

U.S. PATENT DOCUMENTS

| | | | |
|---|---|---|---|
| 2,710,620 | 6/1955 | Watson | 137/118 |
| 3,018,786 | 1/1962 | Stratton | 137/118 |
| 3,473,851 | 10/1969 | Neves | 137/118 X |
| 3,627,385 | 12/1971 | Stokes | 137/87 X |
| 3,738,709 | 6/1973 | Stokes | |
| 3,753,601 | 8/1973 | Hensley | 137/118 X |
| 4,281,880 | 8/1981 | Gaiser et al. | |
| 4,284,308 | 8/1981 | Hayashida | |
| 4,422,694 | 12/1983 | Schopper et al. | |

FOREIGN PATENT DOCUMENTS

| | | | |
|---|---|---|---|
| 491501 | 11/1975 | U.S.S.R. | 303/84.2 |
| 333365 | 8/1930 | United Kingdom | 303/84.2 |

Primary Examiner—Robert G. Nilson
Attorney, Agent, or Firm—Barnes & Thornburg

[57] ABSTRACT

A safety system for hydraulic brakes in a train brake system wherein a spring biased spool valve controls delivery from a hydraulic fluid source to at least two sets of spring applied hydraulic brake actuators and wherein said spool valve is also biased by the fluid pressure delivered to said two sets of brake actuators and upon a rupture in a brake line delivering fluid to one brake actuator, which causes a lowering of a fluid pressure force on the spool valve, causes the spool valve to shut off the delivery of fluid to the ruptured line to allow the spring applied hydraulic brake actuator to engage the applied brake.

6 Claims, 1 Drawing Sheet

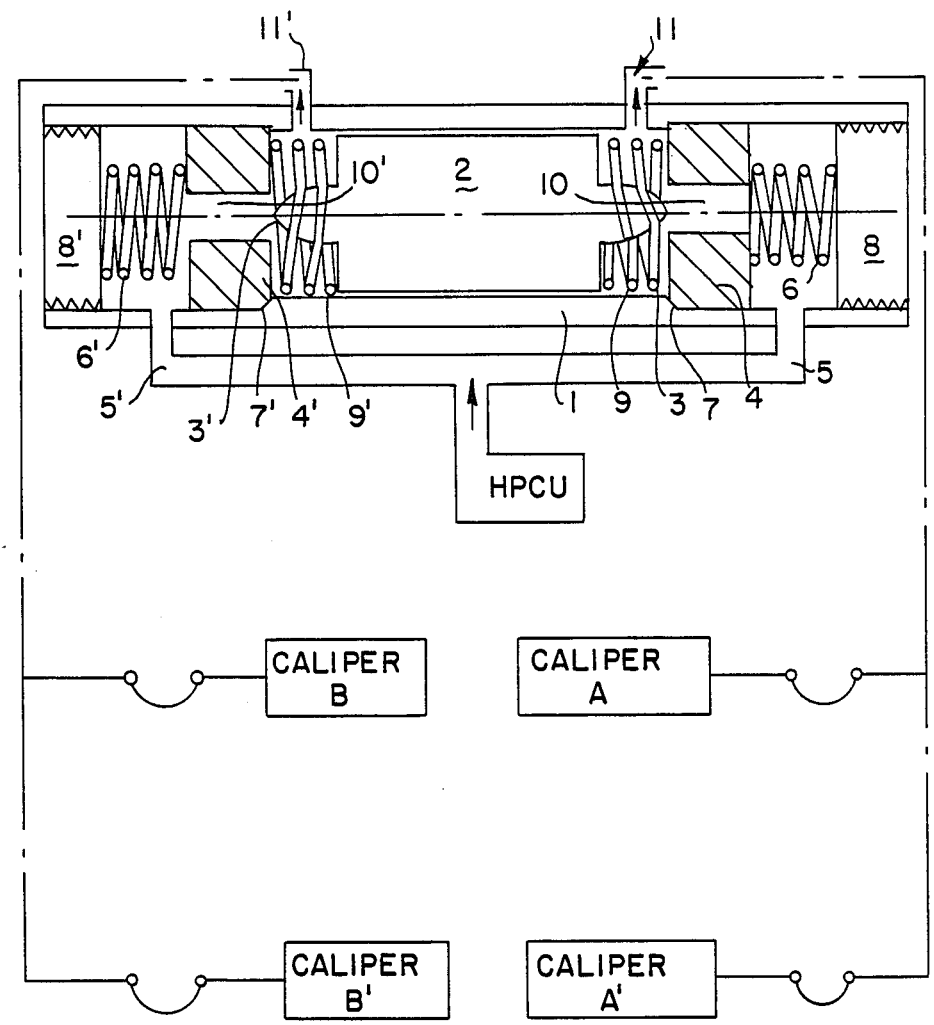

HYDRAULIC ISOLATION VALVE

BACKGROUND AND SUMMARY OF THE INVENTION

This invention relates to an isolation valve for a brake system for trains which minimizes the loss of hydraulic brake fluid upon brake line rupture.

In train brake systems a rupture or break in a brake line causes a loss of hydraulic fluid out of the system onto the track area. This spewing of brake fluid into the environment is a safety hazard, from not only a viewpoint of smell, water and ground pollution, but also fire hazards. Where third rail electric systems come into contact with the leaking fluid, there is a possibility of a fire which could set trains aflame and could cause smoke in train tunnels which could become a safety hazard to train riders waiting in stations or to riders in the train cars themselves.

It is an object of this invention to provide a simple inexpensive safety control system which will shut off the flow of hydraulic fluid to a ruptured or broken brake line.

In particular a spring based spool valve is provided which is also responsive to the force of hydraulic pressure fed to each brake actuator. Upon rupture of the brake line, the pressure of the fluid operating on the spool valve drops causing the spool valve to move to a position where it shuts off the flow of hydraulic fluid to the ruptured brake line.

The spool valve is formed by a spool having a metal stainless steel valving surfaces at each end. The spool is slidable in a housing having two inlet means leading axially into a valving chamber controlled by the valving surface from a source of hydraulic pressure and two outlet means leading to at least two sets of brake actuators. The stainless steel valving surfaces act co-jointly against spring biased stainless steel valve seats to control the flow of fluid from the inlets to the outlets in a positive manner and insure complete shutting off of the flow due to the metal to metal contact between valve surface and seat. The spool valve is spring biased to a central position by two strong spring acting on each end thereof, whereupon both inlets are normally open. The pressure in the outlet lines also acts on the spool valve, with the pressure in each line acting in opposition to one of the two bias springs. When a rupture occurs in one outlet line, the pressure therein drops an amount sufficient to cause the opposing spring and pressure in the other line to slide the spool valve to shut off the inlet line leading to the affected outlet line. Minor variations in pressure are unable to overcome the neutral positioning by the springs.

By having an axial inlet flow to the valve chamber, an improved result is obtained over a side ported inlet. The side ported inlet increases eddy currents from the incoming fluid flow requiring a stronger spring, which strong spring unduly limits the range of pressure which would cause the spool valve to limit flow to the ruptured line. Thus, by use of an axial inlet a greater operational range is obtained so that the valve can assume one of three positions (center, far left or far right) without acting as a proportional valve.

The inlet lines lead from a hydraulic power and control unit (HPCU) to both ends of the spool valve and from there pass through a spring biased valve seats into two chambers containing the spool valve and the bias springs. From each chamber the fluid flows to an outlet line for one set of brake actuators. Outboard of the valve seats are valve seal retainer plugs which can be unscrewed to allow for replacement of any of the valve seats, bias springs, and the valve spool valve.

The brakes are spring actuated and pressure released. The HPCU control unit includes a pressure limit control so that a maximum pressure in the system is not exceeded.

Other objects, advantages and novel features of the present invention will become apparent from the following detailed description of the invention when considered in conjunction with the accompanying drawing.

BRIEF DESCRIPTION OF THE DRAWINGS

The figure shows a schematic of the safety spool cut-off valve of the instant invention.

DETAILED DESCRIPTION OF THE DRAWINGS

Referring now to the drawings wherein like reference numerals are used to designate like parts and more particularly to the figure which shows a housing 1 containing a slidable spool valve 2 therein. The spool valve has two stainless steel valving surfaces 3, 3' at each end thereof, which surfaces 3, 3' cooperate with two stainless steel valve seats 4, 4' to control hydraulic brake fluid delivery from a hydraulic power and control unit (HPCU) through inlet lines 5, 5'.

The valve seats 4, 4' are spring biased by springs 6, 6' against shoulder 7, 7' of the housing, and are held in the housing 1 by screw-on retainers 8, 8'. Strong bias springs 9, 9' act between the valve seats 4, 4' and the spool valve 2 to bias the spool valve into a neutral median position where neither valving, surface 3, 3' closes off the inlet flow through passageway 10, 10' through the valve seats 4, 4' except under large pressure differentials brought about by a rupture in one line. Minor pressure differentials will not overcome the spring bias. Screw-on retainers 8, 8', which can be removed from the housing 1, allow for replacement of any or all of: springs 6, 6', seats 4, 4', spool valve 2; or spool valve bias springs 9, 9'.

Outlets 11, 11' connect the chambers 12, 12' containing the spool valve 2 and the spool bias springs 9, 9' to two sets of brake actuator calipers A, A' and B, B'. The brakes are spring actuated and pressure released, so that a constant brake force is applied for engaging of brakes, regardless of the position of the spool valve (pressure from the spool valve releases the brakes).

In operation, hydraulic fluid from the unit HPCU flows through lines 5, 5', axial passageways 10, 10' in the valve seats 4, 4' to the outlet pipes 11, 11' feeding the two sets (A and B) of brake actuator calipers. Upon rupture occurring in line 11, for example, the pressure force acting on spool valve 2 from the chamber 12 containing bias spring 9, will decrease a significant amount. This large drop in pressure causes the pressure force in the chamber 12 surrounding bias spring 9' to act with bias spring 9' to shift the spool valve 2 to the right whereupon valving surface 3 will close off the axial inlet passageway 10 and thus stop flow to outlet line 11. Rupture in line 11' will operate in a similar fashion.

By having the inlet flow axially directed by passageway 10, 10', as opposed to a side ported arrangement wherein spool valve 2 would cover and uncover a side port in housing 1, turbulence of the incoming fluid is reduced and a weaker spring can be utilized. Even with this weaker spring, the range of spool valve disconnect operation can be between 30 to 780 psi, as opposed to a much narrower range of 300 to 600 psi with a stronger spring and side ported entrances.

The sizes of springs 9, 9' are selected to be sufficiently large so that minor pressure variations will not cause the spool valve 2 to close off the inlets. Also, the valve operates to have basically three positions: far right, center and far left. It is not a proportioning valve.

Thus, it can be seen that the invention provides a simple spring biased spool valve 2 which is operable to close off flow of the hydraulic brake fluid to a set of spring operated brake actuators upon rupture of the brake line leading thereto.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A safety system for hydraulic train brake systems comprising:
   a housing means;
   an isolation spool valve means connected to a source of hydraulic fluid for controlling delivery of said hydraulic fluid from said source in an axial direction to said spool valve and from the spool valve to at least two sets of hydraulic brake actuators;
   said isolation spool valve means located and slidable in said housing and being biased to a neutral position by two spring bias means acting in opposition to each other;
   said housing means having two inlet means from the source of hydraulic pressure and two outlet means;
   said isolation spool valve means also being biased to a neutral position by two fluid pressure forces proportional to the fluid pressure delivered to each brake actuator;
   wherein said spring bias means each are of such strength that the spool valve means only slides to close off an inlet when a drop in the pressure delivered to said one of said sets of hydraulic brake actuators exceeds a predetermined amount, which amount corresponds to a brake line rupture and wherein minor drops in pressure will not close off an inlet;
   said spool valve means including two metal valving surfaces at opposite ends of the spool valve means which is a unitary valve and wherein said valving surfaces cooperate with two metal valving seats located outboard of said unitary spool valve; said valving seats being spring biased into position to cooperate with said two valving surfaces;
   wherein the two spring bias means are located in an area between the valving seats and the spool valve.

2. A safety valve according to claim 1, wherein removable retainer means are provided outboard of the valving seats for permitting removal of the valving seats, the two spring bias for the spool valve means and the spool valve from the housing.

3. A safety system according to claim 2, wherein there are two retainer means, one adjacent each outboard end of the spool valve.

4. A safety system for hydraulic train brake systems comprising:
   a housing means;
   an isolation spool valve means connected to a source of hydraulic fluid for controlling delivery of said hydraulic fluid from said source in an axial direction to said spool valve and from the spool valve to at least two sets of hydraulic brake actuators;
   said isolation spool valve means located and slidable in said housing and being biased to a neutral position by two spring bias means acting in opposition to each other;
   said housing means having two inlet means from the source of hydraulic pressure and two outlet means;
   said isolation spool valve means also being biased to a neutral position by two fluid pressure forces proportional to the fluid pressure delivered to each brake actuator;
   wherein said spring bias means each are of such strength that the spool valve means only slides to close off an inlet when a drop in the pressure delivered to said one of said sets of hydraulic brake actuators exceeds a predetermined amount, which amount corresponds to a brake line rupture and wherein minor drops in pressure will not close off an inlet;

5. A safety system according to claim 4, wherein removable retainer means are provided outboard of the valving seats for permitting removal of the valving seats, their spring bias, the two spring bias for the spool valve means and the spool valve from the housing.

6. A safety system according to claim 5, wherein there are two retainer means, one adjacent each outboard end of the spool valve.

* * * * *